(12) United States Patent
Varekamp et al.

(10) Patent No.: US 8,253,740 B2
(45) Date of Patent: Aug. 28, 2012

(54) METHOD OF RENDERING AN OUTPUT IMAGE ON BASIS OF AN INPUT IMAGE AND A CORRESPONDING DEPTH MAP

(75) Inventors: Christiaan Varekamp, Eindhoven (NL); Wilhelmus Hendrikus Alfonsus Bruls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1036 days.

(21) Appl. No.: 12/280,377

(22) PCT Filed: Feb. 16, 2007

(86) PCT No.: PCT/IB2007/050515
§ 371 (c)(1),
(2), (4) Date: Aug. 22, 2008

(87) PCT Pub. No.: WO2007/096816
PCT Pub. Date: Aug. 30, 2007

(65) Prior Publication Data
US 2009/0115780 A1    May 7, 2009

(30) Foreign Application Priority Data
Feb. 27, 2006 (EP) .................................. 06110455

(51) Int. Cl.
*G06T 15/10* (2006.01)
*G06T 15/00* (2006.01)

(52) U.S. Cl. ........................ 345/427; 345/419

(58) Field of Classification Search .............. None
See application file for complete search history.

(56) References Cited

U.S. PATENT DOCUMENTS

| 5,986,804 | A | 11/1999 | Mashitani et al. |
| 6,064,424 | A | 5/2000 | van Berkel et al. |
| 6,069,650 | A | 5/2000 | Battersby |
| 7,167,188 | B2 * | 1/2007 | Redert ........................ 345/660 |
| 7,321,669 | B2 * | 1/2008 | Southall et al. .............. 382/106 |

(Continued)

FOREIGN PATENT DOCUMENTS

WO        03015424 A2    2/2003

(Continued)

OTHER PUBLICATIONS

Jesse Eichenlaub, "A Lightweight, Compact 2D/3D Autostereoscopic LCD Backlight for Games, Monitor, and Notebook Applications", Jan. 1998, SPIE Digital Library, vol. 3295, pp. 180-185.*

(Continued)

*Primary Examiner* — Ulka Chauhan
*Assistant Examiner* — Anh-Tuan V Nguyen (57) ABSTRACT

A method of rendering an output image (202) on basis of an input image (200) and a corresponding matrix of depth related data (204), the input image (200) corresponding to a first viewpoint and the output image (202) corresponding to a second viewpoint being different from the first viewpoint comprises computing edges (212,312) in the matrix of depth related data (204), computing a measure of variation in pixel values in regions of the input image (200) corresponding to neighborhoods of the edges (212,312), and computing the output image (202) by shifting respective pixel values of the input image (200) in the predetermined direction (X) on basis of scaled depth related data. Scaling, via the scaled depth related data, is such that a relative large measure of variation results in a relative large reduction of depth for the scaled depth related data.

9 Claims, 6 Drawing Sheets

U.S. PATENT DOCUMENTS

| | | | | |
|---|---|---|---|---|
| 7,689,031 B2* | 3/2010 | Berretty et al. | ............... | 382/154 |
| 7,692,646 B2* | 4/2010 | Redert et al. | .................. | 345/419 |
| 7,764,827 B2* | 7/2010 | Op De Beeck et al. | ........ | 382/154 |
| 7,787,658 B2* | 8/2010 | Redert | ........................... | 382/106 |
| 2009/0003728 A1* | 1/2009 | Ernst et al. | .................... | 382/285 |
| 2009/0073170 A1* | 3/2009 | Berretty et al. | ............... | 345/427 |

FOREIGN PATENT DOCUMENTS

| | | |
|---|---|---|
| WO | 2005031652 A1 | 4/2005 |

OTHER PUBLICATIONS

Wan-Yu Chen et al: "Efficient Depth Image Based Rendering with Edge Dependent Depth Filter and Interpolation" Multimedia and Expo, 2005. ICME 2005. IEEE International Conference on Amsterdam, The Netherlands Jul. 6, 2005, Piscataway, NJ, USA IEEE, pp. 1314-1317.

Fehn, C.: "Depth-Image-Based Rendering (DIBR), Compression, and Transmission for a New Approach on 3D-TV" Stereoscopic Displays and Virtual Reality Systems XI, vol. 5291, May 31, 2004, pp. 93-104.

Alan Sullivan: "A Solid-state Multi-planar Volumetric Display", Proceedings of SID'03, 2003 SID, pp. 1531-1533.

Leonard McMillan, et al: "Image-Based Rendering: A New Interface Between Computer Vision and Computer Graphics", Journal of Computer Graphics, vol. 33, No. 4, Nov. 30, 1999, pp. 61-64.

Carlos Vazquez, et al: "Stereoscopic Imaging: Filling Disoccluded Areas in Depth Image-Based Rendering", Three-Dimensional TV, Video, and Display, Proc. of SPIE vol. 6392, Oct. 17, 2006, pp. 1-12.

P. J. Narayanan, et al: "Depth+Texture Representation for Image Based Rendering", International Institute of Information Technology, Hyderbad 500019, Dec. 31, 2004, pp. 1-6.

J. Eichenlaub, "A Lightweight Compact 2-D/3 Auto Steroscopic LCD Backlight for Games, Monitor and Notebook Applications", Proceedings of SPIE , vol. 3295, 1998.

Fan Jian-Ying, et al. "Borderline Inspection of Depth-Image", Journal Harbin Univ. Sci. & Tech., vol. 5, No. 3, pp. 1-3, Jul. 30, 2000.

\* cited by examiner

METHOD OF RENDERING AN OUTPUT IMAGE ON BASIS OF AN INPUT IMAGE AND A CORRESPONDING DEPTH MAP

The invention relates to a method of rendering an output image on basis of an input image and a corresponding matrix of depth related data, the input image corresponding to a first viewpoint and the output image corresponding to a second viewpoint being different from the first viewpoint.

The invention further relates to an image rendering unit for rendering an output image on basis of an input image and a corresponding matrix of depth related data, the input image corresponding to a first viewpoint and the output image corresponding to a second viewpoint being different from the first viewpoint.

The invention further relates to an image processing apparatus, comprising:

receiving means for receiving an input image and a corresponding matrix of depth related data; and an image-rendering unit for rendering an output image on basis of the input image and the corresponding matrix of depth related data.

The invention further relates to a computer program product to be loaded by a computer arrangement, comprising instructions to compute an output image on basis of an input image and a corresponding matrix of depth related data, the input image corresponding to a first viewpoint and the output image corresponding to a second viewpoint being different from the first viewpoint, the computer arrangement comprising processing means and a memory.

Since the introduction of display devices, a realistic three-dimensional (3-D) display device has been a dream for many years. Many principles that should lead to such a display device have been investigated. Some principles try to create a realistic 3-D object in a certain volume. For instance, in the display device as disclosed in the article "Solid-state Multi-planar Volumetric Display", by A. Sullivan in proceedings of SID '03, 1531-1533, 2003, information is displaced at an array of planes by means of a fast projector. Each plane is a switchable diffuser. If the number of planes is sufficiently high the human brain integrates the picture and observes a realistic 3-D object. This principle allows a viewer to look around the object within some extent. In this display device all objects are (semi-) transparent.

Many others try to create a 3-D display device based on binocular disparity only. In these systems the left and right eye of the viewer perceive another image and consequently, the viewer perceives a 3-D image. An overview of these concepts can be found in the book "Stereo Computer Graphics and Other True 3D Technologies", by D. F. McAllister (Ed.), Princeton University Press, 1993. A first principle uses shutter glasses in combination with for instance a CRT. If the odd frame is displayed, light is blocked for the left eye and if the even frame is displayed light is blocked for the right eye.

Display devices that show 3-D without the need for additional appliances, such as glasses, are called auto-stereoscopic display devices.

A first glasses-free display device comprises a barrier to create cones of light aimed at the left and right eye of the viewer. The cones correspond for instance to the odd and even sub-pixel columns. By addressing these columns with the appropriate information, the viewer obtains different views in his left and right eye if he is positioned at the correct spot, and is able to perceive a 3-D impression.

A second glasses-free display device comprises an array of lenses to image the light of odd and even sub-pixel columns to the viewer's left and right eye.

The disadvantage of the above mentioned glasses-free display devices is that the viewer has to remain at a fixed position. To guide the viewer, indicators have been proposed to show the viewer that he is at the right position. See for instance United States patent U.S. Pat. No. 5,986,804 where a barrier plate is combined with a red and green led. In case the viewer is well positioned he sees a green light, and a red light otherwise.

To relieve the viewer of sitting at a fixed position, multi-view auto-stereoscopic display devices have been proposed. See for instance United States patents U.S. Pat. No. 6,064,424 and US20000912. In the display devices as disclosed in U.S. Pat. No. 6,064,424 and US20000912 a slanted lenticular is used, whereby the width of the lenticular is larger than two sub-pixels. In this way there are several views next to each other and the viewer has some freedom to move to the left and right.

A drawback of auto-stereoscopic display devices is the resolution loss incorporated with the generation of 3-D images. It is advantageous that those display devices are switchable between a (two-dimensional) 2-D and 3-D mode, i.e. a single-view mode and a multi-view mode. If a relatively high resolution is required, it is possible to switch to the single view mode since that has higher resolution.

An example of such a switchable display device is described in the article "A lightweight compact 2-D/3-D auto stereoscopic LCD backlight for games, monitor and notebook applications" by J. Eichenlaub in proceedings of SPIE 3295, 1998. It is disclosed that a switchable diffuser is used to switch between a 2-D and 3-D mode. Another example of a switchable auto-stereoscopic display device is described in WO2003015424 where LC based lenses are used to create a switchable lenticular. See also U.S. Pat. No. 6,069,650.

In order to visualize 3-D images, the display device must be provided with the appropriate image data. Preferably, a multi-camera setup is used for the acquisition of the 3-D images. However in many cases normal 2-D cameras have been used for the acquisition of image data. Several techniques exist for the conversion of 2-D image data into 3-D image data. Typically these techniques are based on analysis of the image content. The aim is then to estimate a depth map. A depth map contains for each point in the scene the distance to the camera, i.e. viewpoint. That means that depth values are estimated for the pixels of the 2-D image. Several cues are known for that estimation, e.g. sharpness, color, luminance, size of objects, and junctions of contours of objects, etcetera.

Typically, a large depth value corresponds to a large distance relative to the viewpoint. That means that background objects have larger depth values than foreground objects.

Once the depth map belonging to a 2-D input image is computed a number of images can be rendered which together form a 3-D image or multi-view image. This rendering is typically based on applying transformations of the 2-D input image to compute the respective driving images for driving the display device in order to create the views, whereby the transformations are based on the estimated depth map. In other words, this rendering means that one or more output images are computed on basis of an input image and the corresponding depth map.

Typically, the driving images, i.e. output images, are created by spatially shifting the pixels of the input image with respective amounts of shift. See e.g. the article "Image-Based Rendering: A New Interface Between Computer Vision and Computer Graphics, by L. McMillan and S. Gortler, in Computer Graphics, Vol. 33, No. 4, November 1999, pp. 61-64.

The amounts of shifts are called disparities. So, typically for each pixel there is a corresponding disparity value, together forming a disparity map.

The method of creating driving images by shifting has the limitation that image information in some regions in the driving images remains unknown due to uncovering. Holes occur at depth steps and the size of a hole is proportional to the size of the depth step. Since the information in the hole is not available, filling the hole becomes a guessing game.

It is an object of the invention to provide a method of rendering an output image of the kind described in the opening paragraph, with a relatively low amount of visible artifacts caused by de-occlusion This object of the invention is achieved in that the method comprises:
  computing edges in the matrix of depth related data, by computing derivatives of the depth related data in a predetermined direction;
  computing a measure of variation in pixel values in regions of the input image corresponding to neighborhoods of the edges, the neighborhoods located at the background side of the edges;
  computing the output image by shifting respective pixel values of the input image in the predetermined direction on basis of scaled depth related data, wherein scaling is such that a relative large measure of variation results in a relative large reduction of depth.

The inventors observed that the visibility of artifacts, which may occur by filling in the holes, is related to variation of the pixel values of the background. Typically, the holes, which are created by shifting of pixel values, are filled with pixel values of the background. In other words the pixel values of the background are used to compute estimates for the unknown/unassigned pixel values of the holes. If the pixel values of the background near the edge, i.e. the depth step, are mutually substantially equal, then extrapolation of the pixel values of the background into the hole does not cause substantial annoying image artifacts. However, in case of a textured background, visible distortions/artifacts may occur when background pixels are used to fill the hole.

In the method according to the invention the depth effect is reduced if the background texture variation is relatively high, i.e. the measure of variation is relatively high. Typically, the matrix of depth related data, e.g. depth map is scaled into a scaled depth map, which is subsequently applied for the computation of the output image. Alternatively, the amount of depth reduction is taken into account implicitly while shifting the pixel values, without explicitly scaling the depth related data into scaled depth related data.

For the computation of the measure of variation, preferably only pixel values belonging to the background are used. To determine the regions in the input image which correspond to the background and consequently which regions in the input image correspond to the foreground, edges in the matrix of depth related data are detected. The edges form the borders between the background and the foreground.

As said, the neighborhoods are located at the background side of the edges. That means that the neighborhoods are located at respective first sides of the edges having larger depth relative to the first viewpoint, than areas, which are located at the opposite sides of the edges. The latter areas belong to the foreground.

Depending on the viewpoint of the output image, i.e. the second viewpoint, the set of pixel values for the computation of the measure of variation is determined. Notice that the position of the second viewpoint relative to the first viewpoint determines on which side of the foreground object a hole may occur because of de-occlusion, which has to be filled. That means that the computation of the measure of variation, i.e. the estimation of potential visible artifacts, which could occur if there was no reduction of the amount of scaling, is preferably based on the pixels of the regions in de-occlusion areas. That means that preferably pixel values of the background are taken into account corresponding to de-occlusion areas.

Hence, in an embodiment of the method of rendering an output image according to the invention:
  substantially more positive derivatives of the depth related data are used for computing the edges in the matrix of depth related data than negative derivatives, if the second viewpoint is located on a positive side of the first viewpoint, in the predetermined direction; and
  substantially more negative derivatives of the depth related data are used for computing the edges in the matrix of depth related data than positive derivatives, if the second viewpoint is located on a negative side of the first viewpoint, in the predetermined direction.

In the first case the output image corresponds to a viewpoint which is right from the viewpoint of the input image and in the second case the output image corresponds to a viewpoint which is left from the viewpoint of the input image. That means that from left to right is considered to be positive.

By selective edge detection the appropriate regions in the input image are selected for computing the measure of variation.

In an embodiment of the method of rendering an output image, for computing the edges in the matrix of depth related data, the magnitudes of the respective derivatives are larger than a predetermined threshold. It is preferred that only substantial steps in the depth map are taken into account for the computation of the measure of variation.

In an embodiment of the method of rendering an output image a first border of a particular one of the regions of the input image is determined on basis of the corresponding edge and wherein the opposite border is located at a predetermined number of pixels from the first border, in the predetermined direction. Preferably, the regions in the input image from which pixels are selected for the computation of the measure of variation are based on the selected edges. Preferably, the shapes of the regions correspond to the shape of the corresponding edge.

It is a further object of the invention to provide an image rendering unit for rendering an output image of the kind described in the opening paragraph, which results in a relatively low amount of visible artifacts caused by de-occlusion.

This object of the invention is achieved in that the image rendering unit comprises:
  first computing means for computing edges in the matrix of depth related data, by computing derivatives of the depth related data in a predetermined direction;
  second computing means for computing a measure of variation in pixel values in regions of the input image corresponding to neighborhoods of the edges, the neighborhoods located at the background side of the edges;
  third computing means for computing the output image by shifting respective pixel values of the input image in the predetermined direction on basis of scaled depth related data, wherein scaling is such that a relative large measure of variation results in a relative large reduction of depth.

It is advantageous to apply such an image-rendering unit in an image processing apparatus. Typically such an image processing apparatus comprises a multi-view display device for displaying a number of output images which are based on the input image and optionally displaying the input image too.

Modifications of the image rendering unit and variations thereof may correspond to modifications and variations thereof of the image processing apparatus, the method of rendering an output image and the computer program product, being described.

These and other aspects of the image rendering unit, the method of rendering an output image, the image processing apparatus and the computer program product, according to the invention will become apparent from and will be elucidated with respect to the implementations and embodiments described hereinafter and with reference to the accompanying drawings, wherein.

Same reference numerals are used to denote similar parts throughout the Figures.

Figure 1:
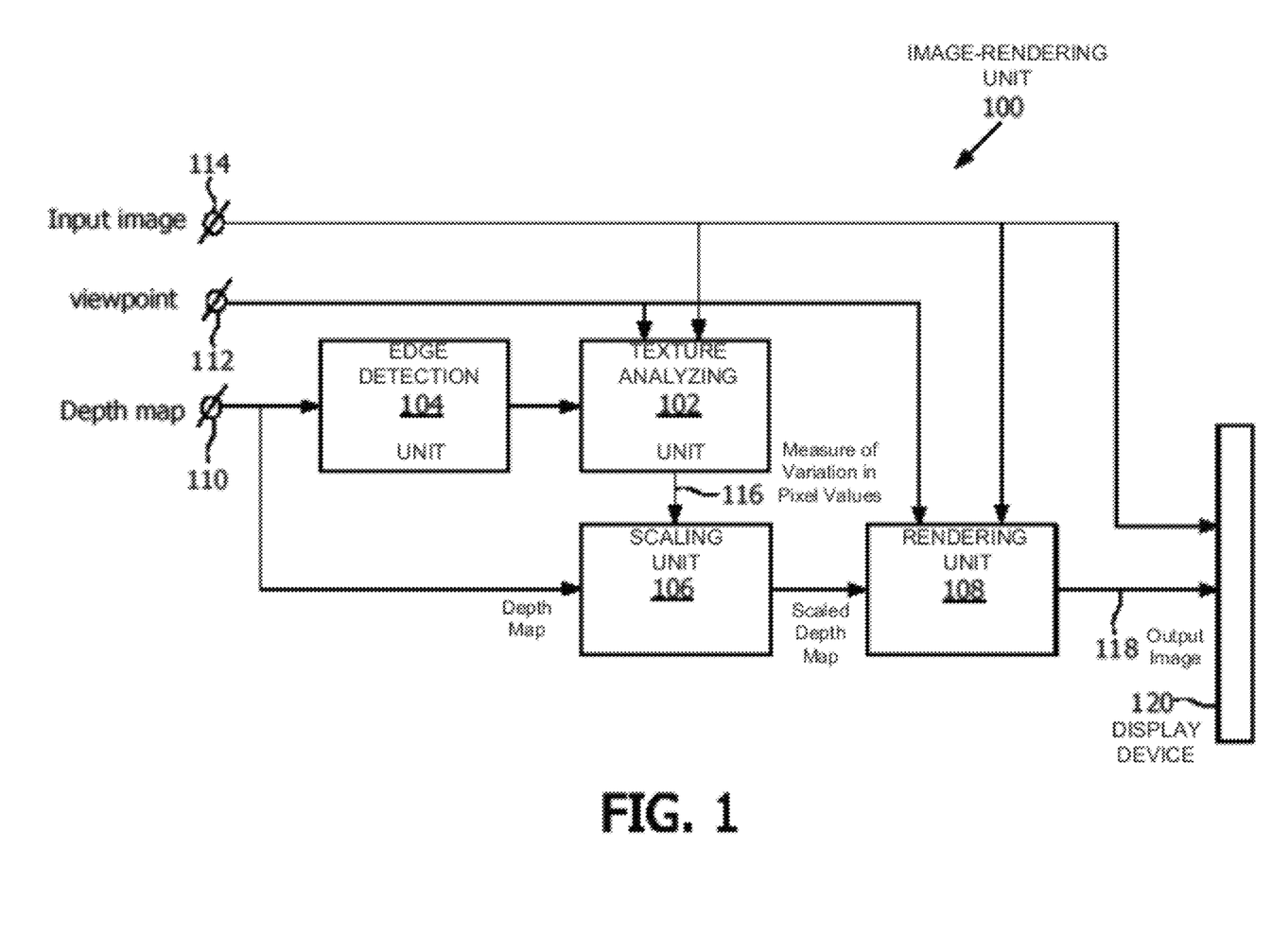
FIG. 1 schematically shows an embodiment of the image rendering unit according to the invention connected to a display device.

FIG. 1 schematically shows an embodiment of the image-rendering unit 100 according to the invention, connected to a display device 120. The image-rendering unit 100 is arranged to compute a set of output images on basis of an input image and a corresponding depth map. The set of output images and typically also the input image are provided to the display device 120. These images together are the driving images to drive the display device 120. The display device 120 is a 3-D display as described and referred to above. Preferably, the display device 120 is a so-called multi-view display device, which is arranged to project a number of views in mutually different directions relative to the screen of the display device. The different directions correspond to different viewpoints, i.e. different points from which the scene being represented by the driving images, are observed.

The image-rendering unit 100 comprises a first input connector 114 for providing the input image to the image-rendering unit 100. Typically a sequence of input images is provided. The image-rendering unit 100 comprises a second input connector 110 for providing a corresponding depth map to the image-rendering unit 100. Typically a sequence of depth maps is provided. The image-rendering unit further comprises a control interface 112 for indicating the required viewpoint of the output image to be rendered.

The image-rendering unit 100 comprises:
an edge detection unit 104 for detecting edges in the depth map, by computing derivatives of the depth values in a predetermined direction;
a texture analyzing unit 102 for computing a measure of variation 116 in pixel values in regions of the input image corresponding to neighborhoods of the edges, the neighborhoods located at the background side of the edges;
a scaling unit 106 for scaling the depth map into a scaled depth map on basis of the computed measure of variation, wherein the scaling is such that a relative large measure of variation results in a relative large reduction of depth;
a rendering unit 108 for computing the output image by shifting respective pixel values of the input image in the predetermined direction on basis of the scaled depth map.

The edge detection unit 104, the texture-analyzing unit 102, the scaling unit 106 and the rendering unit 108 may be implemented using one processor. Normally, these functions are performed under control of a software program product. During execution, normally the software program product is loaded into a memory, like a RAM, and executed from there. The program may be loaded from a background memory, like a ROM, hard disk, or magnetical and/or optical storage, or may be loaded via a network like Internet. Optionally an application specific integrated circuit provides the disclosed functionality.

The edge detection unit 104 is arranged to detect edges in the depth map. Typically, the edge detection is performed by computing differences between neighboring data elements of the depth map, i.e. neighboring depth values. Preferably, only absolute differences between neighboring depth values which are larger than a predetermined threshold Δ are taken into account. Typically, only derivatives of the depth values in a predetermined direction corresponding to the mutual relation between the first viewpoint of the input image and the second viewpoint of the output image to be rendered are computed. On basis of the detected edges and preferably also on basis of the viewpoint of the output image, regions in the input image are determined to compute a measure of variation. The pixels in these regions form the pixel subset $S_{vp}$. The subscript vp is used to indicate that the pixel subset depends on the viewpoint. In connection with FIG. 2 and FIG. 3 will be explained what the relation is between viewpoint and regions.

The texture-analyzing unit 102 is arranged to compute a measure of variation $T_{vp}$ in the pixels of the subset $S_{vp}$. Equation 1 specifies an embodiment for the computation of the measure of variation $T_{vp}$:

$$T_{vp} = \frac{\sum_{k \in S_{vp}} |r(x_k + 1, y_k) - r(x_k, y_k)| + |g(x_k + 1, y_k) - g(x_k, y_k)| + |b(x_k + 1, y_k) - b(x_k, y_k)|}{N_{S_{vp}}} \quad (1)$$

where $N_{S_{vp}}$ is the number of pixels in the subset $S_{vp}$, $r(x_k, y_k)$ is the red component of the pixel value with coordinates $(x_k, y_k)$, $g(x_k, y_k)$ is the green component of the pixel value with coordinates $(x_k, y_k)$, $b(x_k, y_k)$ is the blue component of the pixel value with coordinates $(x_k, y_k)$ and k is an index. The texture measure $T_{vp}$ is the average horizontal color change in the input image from one pixel to the next in the x direction, averaged over the region. The red, green, blue color space is used, but another color representation for the input image also works. Alternatively, the luminance component of the pixels in the region is taken into account for the computation of the measure of variation.

It should be stretched that the region doesn't have to be a connected region. That means that there may be multiple areas in the input image from which pixels are selected for the computation of the measure of variation $T_{vp}$.

The scaling unit 106 is arranged to scale the depth map into a scaled depth map. The scaling is such that a relative large measure of variation $T_{vp}$ results in a relative large reduction of depth. Typically the scaling is a multiplication with a scaling factor, which is a function $f(T_{vp})$ of the measure of variation $T_{vp}$:

$$z_{vp}^{scaled}(x,y) = f(T_{vp}) \cdot z(x,y) \qquad (2)$$

the subscript vp is used to indicate that the scaled depth map depends on the viewpoint. Typically, the scaling is implemented by means of a lookup table (LUT). Alternatively, the scaling is not a global scaling but a local scaling of the depth map.

The rendering unit 108 is arranged to compute the output image by shifting respective pixel values of the input image in the predetermined direction on basis of the scaled depth map. See e.g. the article "Image-Based Rendering: A New Interface Between Computer Vision and Computer Graphics, by L. McMillan and S. Gortler, in Computer Graphics, Vol. 33, No. 4, November 1999, pp. 61-64 for a description of this type of rendering.

Next, in connection with FIG. 2 and FIG. 3 will be explained that the subset $S_{vp}$ depends on the viewpoints of the respective output images 202, 302 relative to the viewpoint of the input image 200. Suppose that the input image 200 corresponds to the center view and that two different output images 202, 302 have to be computed. The first one of the output images 202 is located right from the input image 200 and the second one of the output images 302 is located left from the input image 200. That means that the viewpoint of the first one of the output images 202 is located at a positive side of the viewpoint of the input image, in the x direction and that the viewpoint of the second one of the output images 302 is located on a negative side of the viewpoint of the input image 200, in the x direction.

Figure 2:
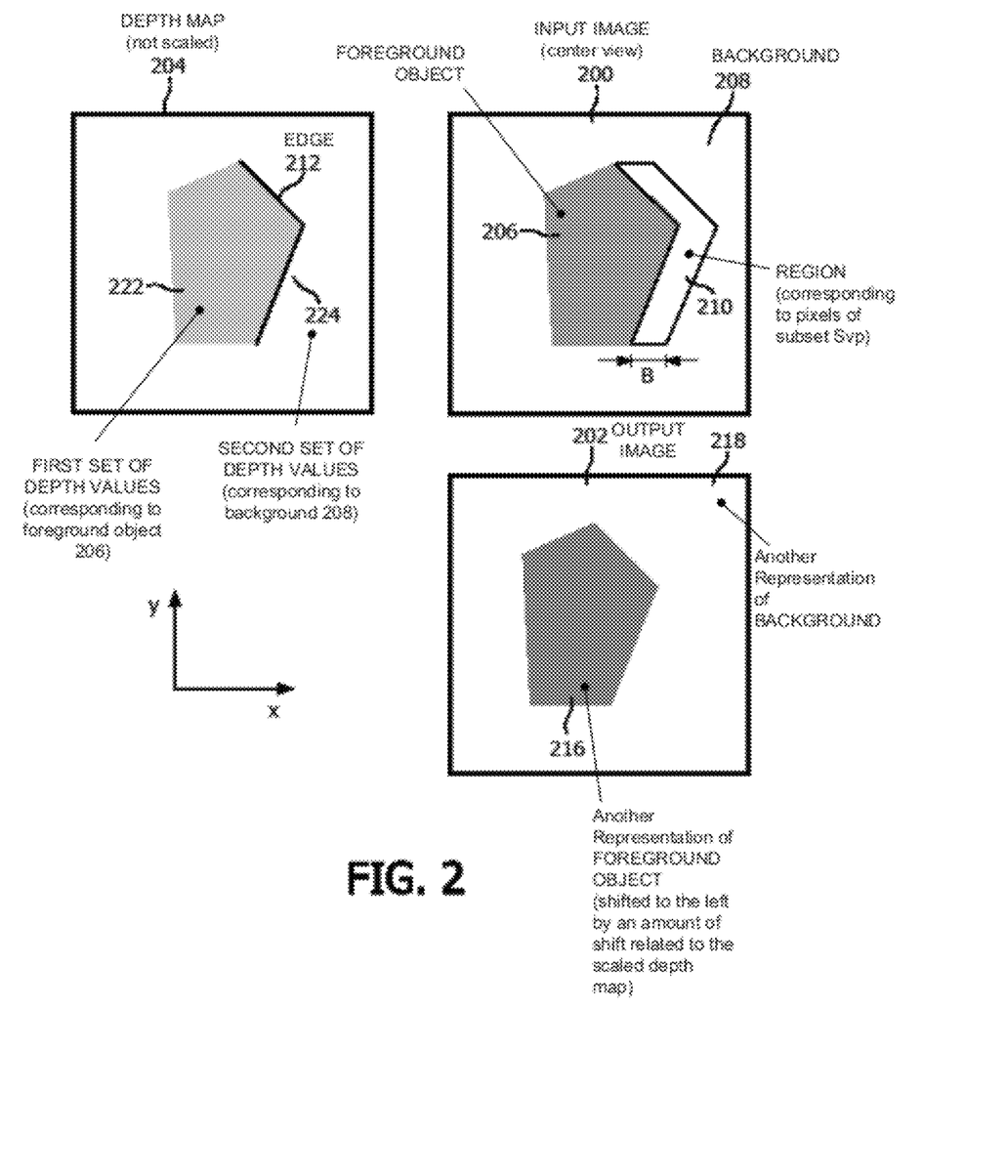
FIG. 2 schematically shows an input image, a corresponding depth map and the output image based on the input image and the depth map, whereby the output image corresponds to a viewpoint which is located at the right side of the input image.

FIG. 2 schematically shows the input image 200, the corresponding original not scaled depth map 204 and the first one of the output images 202 based on the input image 200. FIG. 2 shows a representation 206 of an object located in the foreground and shows background 208. In FIG. 2 also a region 210 is depicted which corresponds to the pixels of the subset $S_{vp}$. The depth map 204 has a first set 222 of depth values corresponding to the object 206 and a second set 224 of depth values corresponding to background. The edge 212 in the depth map 204 is located at the positions where the step between neighboring values is relatively high and has a positive sign. The edge 212 corresponds to one of the borders of the region 210 in the input image 200. The opposite border of the region 210 is located at a predetermined number of pixels B from the first border, in the predetermined direction x.

The first one of the output images 202 shows another representation 216 of the same object as represented in the input image 200, but shifted to the left, whereby the amount of shift is related to a scaled depth map. The scaled depth map is not depicted in FIG. 2. The scaled depth map is derived from the depth map 204.

For the first one of the output images 202 holes are introduced if $z(x_i, y_i) - z(x_i-1, y_i) > 0$ with i being an index. Creating the subset $S_{vp}$ of pixels in the input image 200 for the computation of the measure of variation $T_{vp}$ required for scaling the depth map for rendering of the first one of the output images 202 is based on selecting pixels j for which $0 < x_j - x_i < B$, where B is a distance to a depth change of magnitude $z(x_i, y_i) - z(x_i-1, y_i) > \Delta$.

Depth change, depth step and derivative of depth values are different terms of the same concept.

Figure 3:
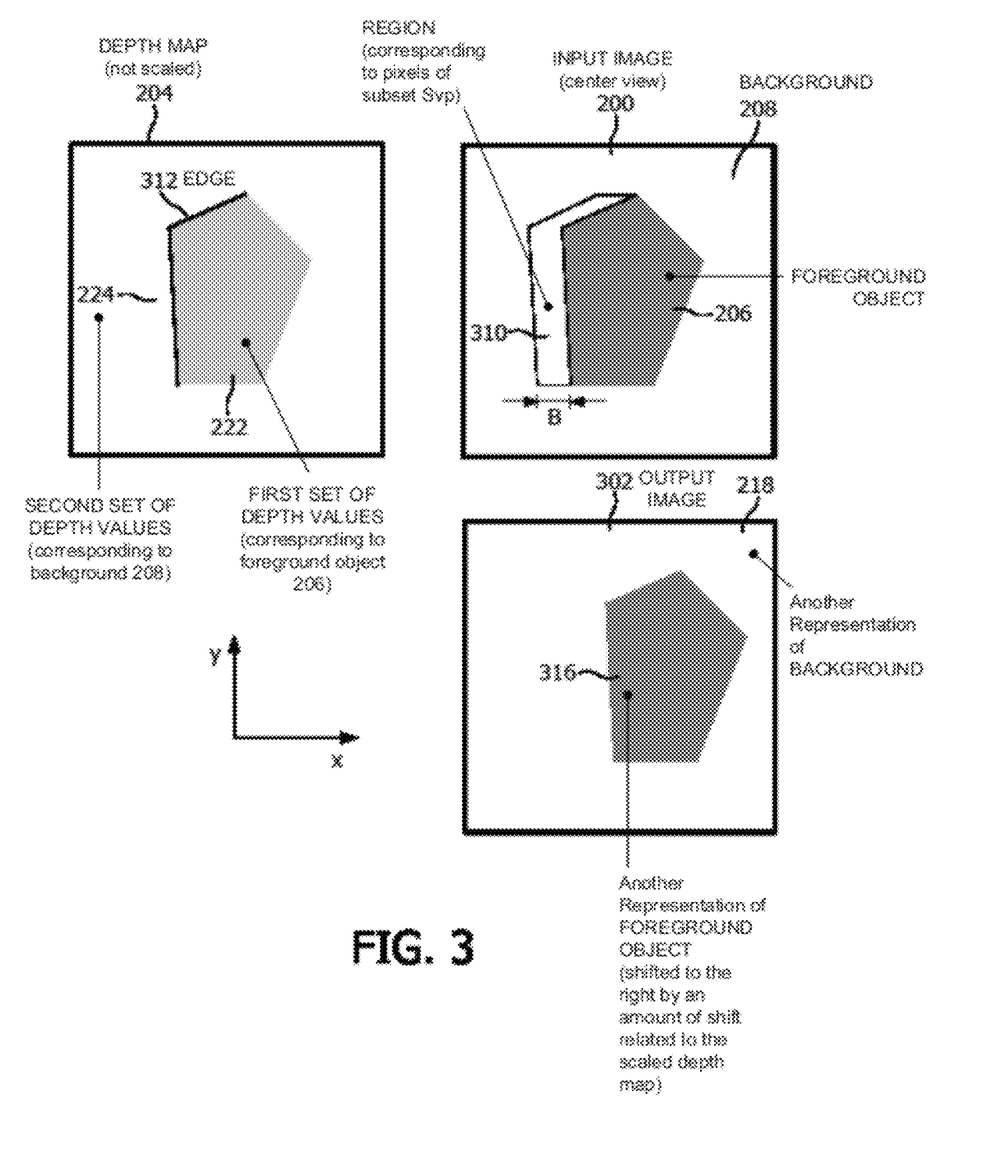
FIG. 3 schematically shows an input image, a corresponding depth map and the output image based on the input image and the depth map, whereby the output image corresponds to a viewpoint which is located at the left side of the input image.

FIG. 3 schematically shows the input image 200, the corresponding original, i.e. not scaled depth map 204 and the second one of the output images 302 based on the input image 200. FIG. 3 shows a representation 206 of an object located in the foreground and shows background 208. In FIG. 2 also a region 310 is depicted which corresponds to the pixels of the subset $S_{vp}$. The depth map 204 has a first set 222 of depth values corresponding to the object 206 and a second set 224 of depth values corresponding to background. The edge 212 in the depth map 204 is located at the positions where the step between neighboring values is relatively high and has a negative sign. The edge 312 corresponds to one of the borders of the region 310 in the input image 200. The opposite border of the region 210 is located at a predetermined number of pixels B from the first border, reverse to the predetermined direction x.

The second one of the output images 302 shows another representation 316 of the same object as represented in the input image 200, but shifted to the right, whereby the amount of shift is related to a scaled depth map. The scaled depth map is not depicted in FIG. 3. The scaled depth map is derived from the depth map 204.

For the second one of the output images 302 holes are introduced if $z(x_i-1, y_i) - z(x_i, y_i) > 0$ with i being an index. Creating the subset $S_{vp}$ of pixels in the input image 200 for the computation of the measure of variation $T_{vp}$ required for scaling the depth map for rendering of the second one of the output images 302 is based on selecting pixels j for which $0 < x_j - x_i < B$, where B is a distance to a depth change of magnitude $z(x_i-1, y_i) - z(x_i, y_i) > \Delta$.

It will be clear that typically the scaled depth values for the first one of the output images 202 and the respective scaled depth values for the second one of the output images 302 are mutually different.

$$z_{vp=Left}^{scaled}(x,y) \neq z_{vp=Right}^{scaled}(x,y) \qquad (3)$$

Suppose that on basis of a single input image a set of driving images is created for a nine-view display device, whereby the input image corresponds to the center image of the set of driving images. There is a first subset of four driving images having respective viewpoints, which are, located right from the center view and there is a second subset of four driving images having respective viewpoints which are located left from the center view. In that case it is preferred that for the first subset $z_{vp=Right}^{scaled}(x, y)$ is used and that for the second subset $z_{vp=Left}^{scaled}(x, y)$ is used.

Figure 4:
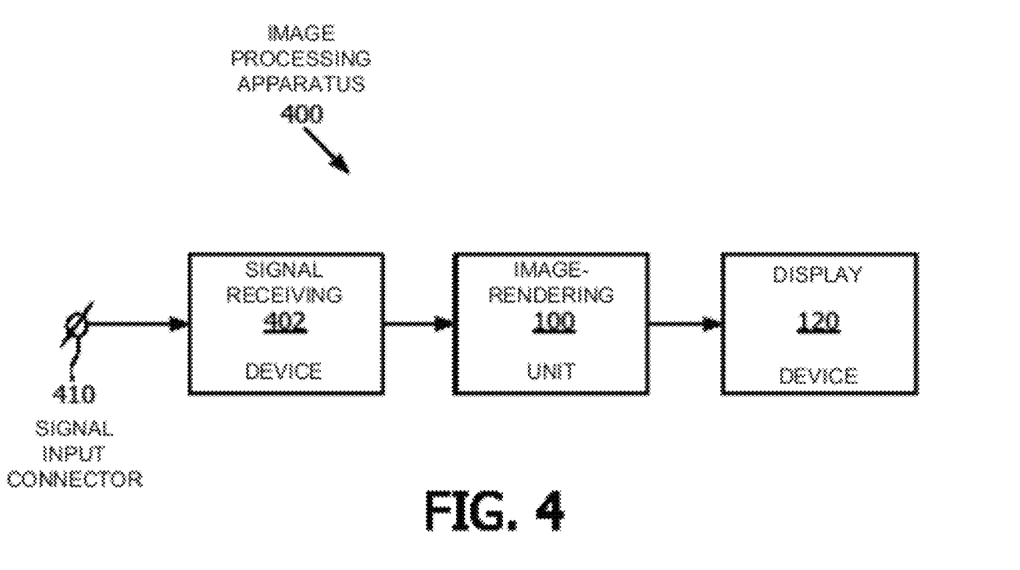
FIG. 4 schematically shows an image processing apparatus according to the invention.

FIG. 4 schematically shows an image processing apparatus 400 according to the invention, comprising:
- receiving means 402 for receiving a signal representing input images and optionally for receiving corresponding depth maps. Alternatively the image processing apparatus is arranged to compute the depth maps itself on basis of the received input images;
- the image rendering unit 100 as described in connection with FIG. 1; and
- a display device 120 for displaying the output images of the image rendering unit 100 and preferably also for displaying the input images together with the rendered output images.

The signal may be a broadcast signal received via an antenna or cable but may also be a signal from a storage device like a VCR (Video Cassette Recorder) or Digital Versatile Disk (DVD). The signal is provided at the input connector 410. The image processing apparatus 400 might e.g. be a TV. Alternatively the image processing apparatus 400 does not comprise the optional display device but provides the output images to an apparatus that does comprise a display device 120. Then the image processing apparatus 400 might be e.g. a set top box, a satellite-tuner, a VCR player, a DVD player or recorder. Optionally the image processing apparatus 400 comprises storage means, like a hard disk or means for storage on removable media, e.g. optical disks. The image processing apparatus 400 might also be a system being applied by a film-studio or broadcaster.

Figure 5:
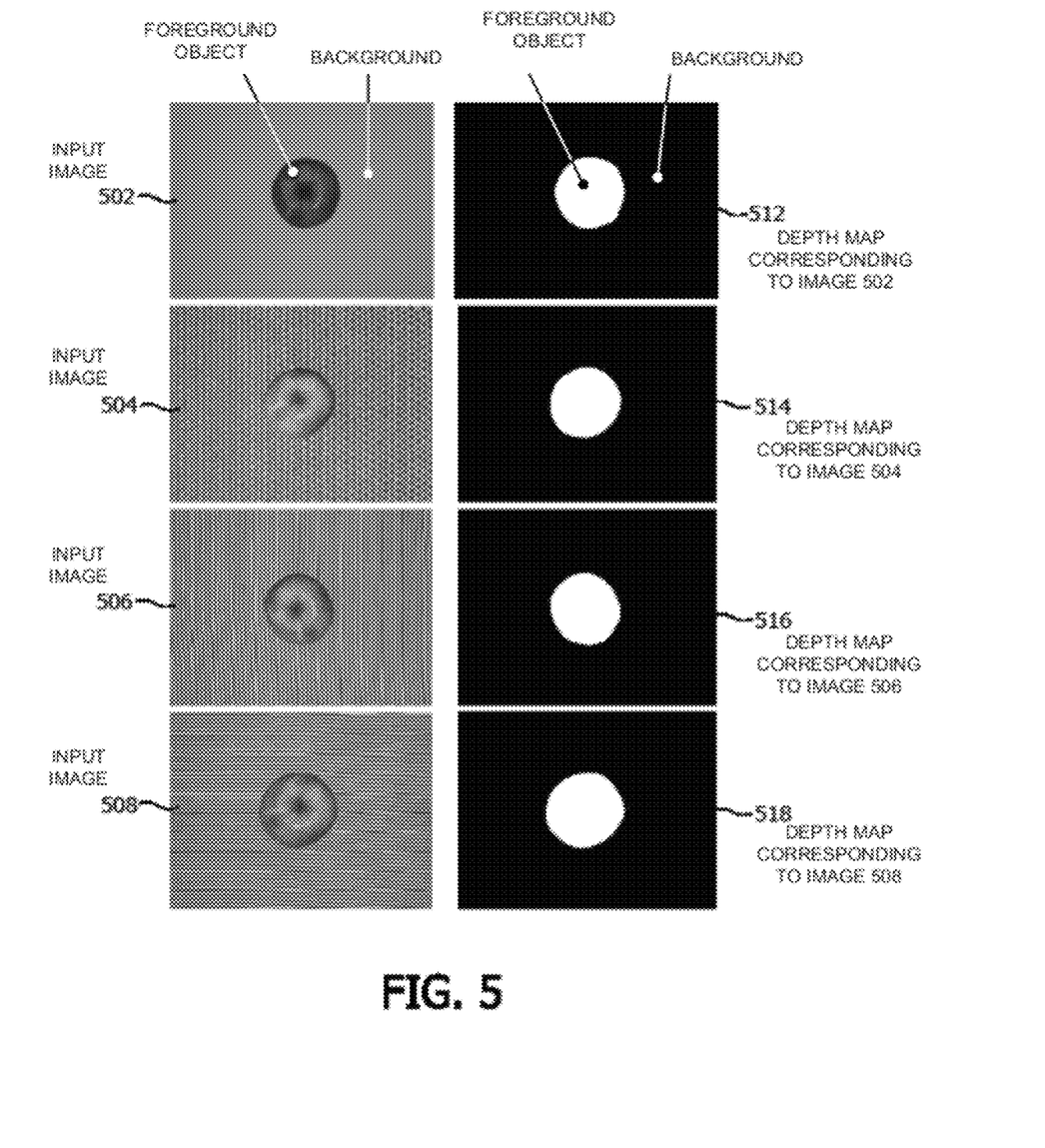
FIG. 5 shows a number of input images and the corresponding depth maps.

FIG. 5 shows a number of input images 502-508 and the corresponding depth maps 512-518, respectively. The input images 502-508 all represent an apple in front of a background. The main difference between the input images 502-508 is the background. The position of the apple is another difference but that is not relevant in the context of this specification. The amount of texture in the background, which can be quantified by means of the measure of variation, is different.

The gray values of the depth maps 512-518 represent the depth values.

Figure 6:
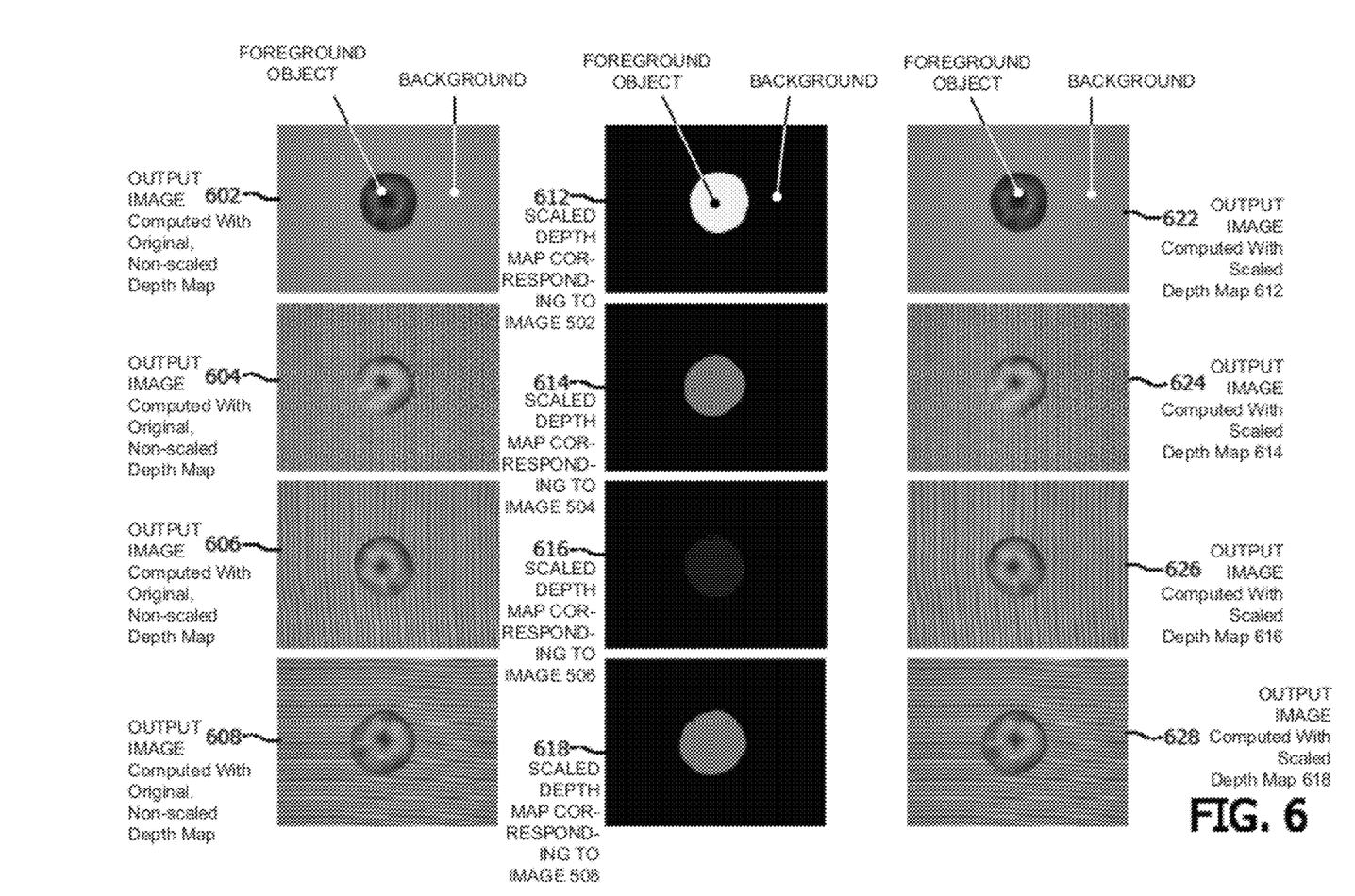
FIG. 6 shows a number of output images based on the input images of FIG. 5.

FIG. 6 shows a number of output images 602-608, 622-628 based on the input images 502-508 of FIG. 5. The left column shows the output images 602-608 of the respective input images 502-508 which are computed by the original not scaled depth maps as depicted in FIG. 5. In particular the output images indicated with reference numbers 604 and 606 show clear artifacts at the right side of the apple. These artifacts are especially visible because of the relatively large amount of texture.

The middle column shows the scaled depth maps 612-618. The gray values represent the depth values. By comparing the gray values of the scaled depth map depicted in FIG. 6 which is referred to with reference number 612 with the gray values of the original depth map depicted in FIG. 5 which is referred to with reference number 512, it can be seen that said depth maps are substantially mutually equal. This is not surprising because the background of the corresponding input image 502 is substantially homogeneous. However, by comparing the gray values of the scaled depth map depicted in FIG. 6 which is referred to with reference number 616 with the gray values of the original depth map depicted in FIG. 5 which is referred to with reference number 516, it can be seen that said latter depth maps are mutually substantially different. That means that the dynamic range of the depth values is strongly reduced. The relatively large amount of texture is the reason for that.

The right column shows the output images 622-628 which are rendered on basis of the scaled depth maps 612-618, respectively. As can be seen in FIG. 6, in particular in the second and third row the amount of artifacts is strongly reduced. The price for this reduction in the amount of artifacts is a reduction of depth perception.

In the embodiments according to the invention as described in connection with FIG. 1 to FIG. 6, depth has been specified as a measure of physical distance between a viewpoint and a point in a scene. The claims have to be interpreted on basis of this specification. It will be clear that alternative quantities can be used to express depth. For instance depth may be expressed as a distance from a particular point in the scene being most far away from the camera. That would mean that background would have a relatively low depth and that foreground has a relatively high depth. Alternative quantities for depth, like the inverse of distance could be used too. In those cases, words like large and reduction should be replaced by small and increase, respectively.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etcetera do not indicate any ordering. These words are to be interpreted as names. No specific sequence of acts is intended to be required unless specifically indicated.

The invention claimed is:

1. A method of rendering an output image on basis of an input image and a corresponding matrix of depth related data, the input image corresponding to a first viewpoint and the output image corresponding to a second viewpoint being different from the first viewpoint, the method comprising:

computing edges, via an edge detection unit, in the matrix of depth related data, by computing only derivatives of the depth related data in a predetermined direction (X), the edges corresponding to edges between (i) an object in a foreground of the input image and (ii) a background of the input image;

computing a measure of variation in pixel values of the input image, via a texture analyzing unit, in regions of the input image that form a pixel subset ($S_{vp}$) that depends on the second viewpoint corresponding to neighborhoods of selected ones of the edges in de-occlusion areas as a function of the second viewpoint, wherein the neighborhoods in the de-occlusion areas are located at a background side of the selected ones of the edges, and wherein the computed measure of variation is a texture measure ($T_{vp}$) that comprises an average horizontal color change in the input image from one pixel to the next in the predetermined direction (X), averaged over a corresponding region of the pixel subset ($S_{vp}$); and computing the output image, via scaling and rendering units, by shifting respective pixel values of the input image in the predetermined direction (X) on basis of scaled depth related data, wherein the scaled depth related data comprises depth related data having been scaled on basis of the computed measure of variation, further wherein scaling via the scaled depth related data is such that a relative large measure of variation in pixel values in the regions of the input image that form the pixel subset ($S_{vp}$) of corresponding neighborhoods of the select ones of the edges in the de-occlusion areas results in a relative large reduction of depth perception via a reduction in dynamic range of depth values in the scaled depth related data scaled on the basis of the computed measure of variation.

2. The method of rendering an output image as claimed in claim 1, wherein for computing, via the edge detection unit, the edges in the matrix of depth related data:

more positive derivatives of the depth related data are used than negative derivatives, if the second viewpoint is located on a positive side of the first viewpoint, in the predetermined direction (X); and more negative derivatives of the depth related data are used than positive derivatives, if the second viewpoint is located on a negative side of the first viewpoint, in the predetermined direction (X).

3. The method of rendering an output image as claimed in claim 1, wherein for computing, via the edge detection unit, the edges in the matrix of depth related data, the magnitudes of the respective derivatives are larger than a predetermined threshold.

4. The method of rendering an output image as claimed in claim 1, wherein a first border of a particular one of the regions of the input image is determined on basis of the corresponding edge and wherein the opposite border is located at a predetermined number of pixels from the first border, in the predetermined direction (X).

5. The method of rendering an output image as claimed in claim 1, wherein scaling is performed globally in the input image.

6. The method of rendering an output image as claimed in claim 1, wherein scaling is performed locally in the input image depending on a locally computed measure of variation.

7. An image rendering unit for rendering an output image on basis of an input image and a corresponding matrix of depth related data, the input image corresponding to a first viewpoint and the output image corresponding to a second viewpoint being different from the first viewpoint, the image rendering unit comprising:
  first computing means for computing edges in the matrix of depth related data, by computing only derivatives of the depth related data in a predetermined direction (X), the edges corresponding to edges between (i) an object in a foreground of the input image and (ii) a background of the input image;
  second computing means for computing a measure of variation in pixel values of the input image in regions of the input image that form a pixel subset ($S_{vp}$), that depends on the second viewpoint corresponding to neighborhoods of selected ones of the edges in de-occlusion areas as a function of the second viewpoint, wherein the neighborhoods in the de-occlusion areas are located at a background side of the selected ones of the edges, and wherein the computed measure of variation is a texture measure ($T_{vp}$) that comprises an average horizontal color change in the input image from one pixel to the next in the predetermined direction (X), averaged over a corresponding region of the pixel subset ($S_{vp}$); and
  third computing means for computing the output image by shifting respective pixel values of the input image in the predetermined direction (X) on basis of scaled depth related data, wherein the scaled depth related data comprises depth related data having been scaled on basis of the computed measure of variation, further wherein scaling via the scaled depth related data is such that a relative large measure of variation in pixel values in the regions of the input image that form the pixel subset ($S_{vp}$) of corresponding neighborhoods of the select ones of the edges in the de-occlusion areas results in a relative large reduction of depth perception via a reduction in dynamic range of depth values in the scaled depth related data scaled on the basis of the computed measure of variation.

8. An image processing apparatus comprising:
  receiving means for receiving an input image and a corresponding matrix of depth related data; and
  an image rendering unit for rendering an output image on basis of the input image and the corresponding matrix of depth related data, as claimed in claim 5.

9. A non-transitory computer readable medium encoded with a computer program to be loaded by a computer arrangement, comprising instructions to compute an output image on basis of an input image and a corresponding matrix of depth related data, the input image corresponding to a first viewpoint and the output image corresponding to a second viewpoint being different from the first viewpoint, the computer arrangement comprising processing means and a memory, the computer program, after being loaded, providing said processing means with the capability to carry out:
  computing edges in the matrix of depth related data, by computing only derivatives of the depth related data in a predetermined direction (X), the edges corresponding to edges between (i) an object in a foreground of the input image and (ii) a background of the input image;
  computing a measure of variation in pixel values of the input image in regions of the input image that form a pixel subset ($S_{vp}$), that depends on the second viewpoint corresponding to neighborhoods of selected ones of the edges in de-occlusion areas as a function of the second viewpoint, wherein the neighborhoods in the de-occlusion areas are located at a background side of the selected ones of the edges, and wherein the computed measure of variation is a texture measure ($T_{vp}$) that comprises an average horizontal color change in the input image from one pixel to the next in the predetermined direction (X), averaged over a corresponding region of the pixel subset ($S_{vp}$); and
  computing the output image by shifting respective pixel values of the input image in the predetermined direction (X) on basis of scaled depth related data, wherein the scaled depth related data comprises depth related data having been scaled on basis of the computed measure of variation, further wherein scaling via the scaled depth related data is such that a relative large measure of variation in pixel values in the regions of the input image that form the pixel subset ($S_{vp}$) of corresponding neighborhoods of the selected ones of the edges in the de-occlusion areas results in a relative large reduction of depth perception via a reduction in dynamic range of depth values in the scaled depth related data scaled on the basis of the computed measure of variation.

* * * * *